(12) United States Patent
Panchal et al.

(10) Patent No.: US 8,892,109 B2
(45) Date of Patent: Nov. 18, 2014

(54) METHOD AND APPARATUS OF DYNAMIC SPECTRUM SHARING IN CELLULAR NETWORKS

(75) Inventors: Jignesh S. Panchal, Somerset, NJ (US); Milind M. Buddhikot, Bridgewater, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 28 days.

(21) Appl. No.: 13/461,979

(22) Filed: May 2, 2012

(65) Prior Publication Data
US 2013/0295946 A1    Nov. 7, 2013

(51) Int. Cl.
*H04W 72/00*    (2009.01)
(52) U.S. Cl.
USPC .......... 455/452.1; 455/560; 455/450; 370/329
(58) Field of Classification Search
CPC ..... H04W 16/00; H04W 16/10; H04W 16/12; H04W 16/14
USPC ............ 455/452.1, 456.5, 560, 461; 370/329, 370/336, 437
See application file for complete search history.

(56) References Cited

U.S. PATENT DOCUMENTS

| | | | | |
|---|---|---|---|---|
| 2004/0185884 A1* | 9/2004 | Marin et al. | | 455/466 |
| 2009/0059856 A1* | 3/2009 | Kermoal et al. | | 370/329 |
| 2009/0170472 A1* | 7/2009 | Chapin et al. | | 455/410 |
| 2011/0002274 A1* | 1/2011 | Grandblaise et al. | | 370/329 |
| 2012/0120887 A1* | 5/2012 | Deaton et al. | | 370/329 |

OTHER PUBLICATIONS

Milind M. Buddhikot, Cognitive Radio, DSA and Self-X: Toward Next Transformation in Cellular Networks (Invited Position Paper) Proceedings of IEEE DySPAN 2010, Singapore, Apr. 2010, 5 pages.
M. Buddhikot, P. Kolodzy, S. Miller, K. Ryan and J. Evans, DIMSUMnet: New Directions in Wireless Networking Using Coordinated Dynamic Spectrum Access, Position Paper in IEEE International Symposium on a World of Wireless, Mobile and Multimedia Networks (IEEE WoWMoM 2005), Taromina/Giardini Naxos, Italy, Jun. 2005, 8 pages.
C. Gerami, N. Mandayam, L. Greenstein, Backhauling in TV White Spaces, Proc. IEEE Globecom 2010, 6 pages.
3GPP TS 36.133, Evolved Universal Terrestrial Radio Access (E-UTRA) and Evolved Universal Terrestrial Radio Access Network (E-UTRAN)—Requirements for support of radio resource management, 106 pages, V10.4.0 (Sep. 2011), Valbonne—France, http://www.3gpp.org/ftp/Specs/html-info/36133.htm.

(Continued)

*Primary Examiner* — Wayne Cai
(74) *Attorney, Agent, or Firm* — Harness, Dickey & Pierce

(57) ABSTRACT

According to a disclosed method, an MME in a network analyzes KPIs from the cells it serves and based on the KPIs, it decides to engage in sharing. The MME then contacts a sharing entity (SE) to announce that it wants to supply spectrum for sharing. The MME obtains terms of a sharing agreement from the SE and the MME obtains the identity of the other network. In response to this information, the MME configures its base stations to support the supplying of spectrum to the other network. The SE applies knowledge of network topology and of services offered. This knowledge is obtained from a sharing database. At the expiration of the sharing agreement, the SE tells the MMEs to deactivate the sharing agreement.

8 Claims, 8 Drawing Sheets

(56) References Cited

OTHER PUBLICATIONS

3GPP TS 36.214, Evolved Universal Terrestrial Radio Access (E-UTRA) and Evolved Universal Terrestrial Radio Access Network (E-UTRAN)—Physical Layer Measurements. 14 pages, V10.1.0 (Mar. 2011), Valbonne—France, http://www.3gpp.org/ftp/Specs/html-info/36214.htm.

3GPP TS 36.300, Evolved Universal Terrestrial Radio Access (E-UTRA) and Evolved Universal Terrestrial Radio Access Network (E-UTRAN)—Overall description. pp. 1-37, pp. 58-89, pp. 116-119, pp. 120-154, V10.4.0 (Jun. 2011), Valbonne—France, http://www.3gpp.org/ftp/Specs/html-info/36300.htm.

3GPP TS 36.331, Evolved Universal Terrestrial Radio Access (E-UTRA) and Evolved Universal Terrestrial Radio Access Network (E-UTRAN)—Radio Resource Control (RRC) and protocol specification. 106 pages, V10.3.0 (Sep. 2011), Valbonne—France, http://www.3gpp.org/ftp/Specs/html-info/36331.htm.

3GPP TS 23.251, Network Sharing; Architecture and functional description. 28 pages, V11.0.0 (Sep. 2011), Valbonne—France, http://www.3gpp.org/ftp/Specs/html-info/23251.htm.

3GPP TS 25.304, Evolved Universal Terrestrial Radio Access (E-UTRA) and Evolved Universal Terrestrial Radio Access Network (E-UTRAN)—User Equipment (UE) procedures in idle mode and procedures for cell reselection in connected mode. 52 pages, V10.1.0 (Jun. 2011), Valbonne—France, http://www.3gpp.org/ftp/Specs/html-info/25304.htm.

Caroline Gabriel, "Swedish operators take RAN sharing trend into LTE", Rethink Wireless, Apr. 14, 2009, 3 pages. http://www.rethink-wireless.com/article.asp?article_id=1262.

Roy Rubenstein, "Technology Trends: Mobile network sharing: Share issues", Total Telecom, Jun. 25, 2009, 2 pages. http://www.totaltele.com/view.aspx?ID=446761.

Dr. Alastair Brydon, 3G-Infrastructure Sharing: The Future for Mobile Networks, Analysis Mason Group, Feb. 2008, 6 pages. http://www.researchandmarkets.com/reports/591031/3g_infrastructure_sharing_the_future_for_mobile.

Unwired Insight, "Extensive coverage is essential to achieve high penetration of mobile broadband,"Jul. 18, 2011. "Scenarios for the Future of the Global Wireless Industry,"Dec. 7, 2010. "3G Infrastructure Sharing," Dec. 6, 2010. "Extensive 3G infrastructure sharing is now inevitable," Feb. 28, 2008. "The future looks uncertain for mobile equipment vendors," Feb. 20, 2008. "Mobile Operators must develop a robust business case for femtocells,"Nov. 30, 2007. "Decision time for mobile operators face with declining spend," Jun. 15, 2007. 10 pages, http://www.unwiredinsight.com.

3GPP TS 25.304, User Equipment (UE) procedures in idle mode and procedures for cell reselection in connected mode. 52 pages, V10.4.0 (Mar. 2012), Valbonne—France, http://www.3gpp.org.

3GPP TS 36.321, Evolved Universal Terrestrial Radio Access (E-UTRA); Medium Access Control (MAC) protocol specification. pp. 1-4, pp. 12-31, V10.5.0 (Mar. 2012), Valbonne—France, http://www.3gpp.org.

3GPP TS 36.300, Evolved Universal Terrestrial Radio Access (E-UTRA) and Evolved Universal Terrestrial Radio Access Network (E-UTRAN)—Overall description; Stage 2. pp. 1-11, pp. 58-93, V11.1.0 (Mar. 2012), Valbonne—France, http://www.3gpp.org.

3GPP TS 36.331, Evolved Universal Terrestrial Radio Access (E-UTRA); Radio Resource Control (RRC); Protocol specification. pp. 1-12, pp. 109-198, V10.5.0 (Mar. 2012), Valbonne—France, http://www.3gpp.org.

M. Iwamura, et. al, "Carrier Aggregation Framework in 3GPP LTE-Advanced," IEEE Comm. Mag. (Aug. 2010) 60-67.

* cited by examiner

RESOURCE SHARING PROCESS

METHOD AND APPARATUS OF DYNAMIC SPECTRUM SHARING IN CELLULAR NETWORKS

CROSS-REFERENCE TO RELATED APPLICATIONS

The subject matter of this patent application is related to the subject matter of the commonly assigned U.S. patent application Ser. No. 13/253,120, filed on Oct. 5, 2011 by M. Buddhikot and J. Panchal under the title "Dynamic Resource Sharing among Cellular Networks."

FIELD OF THE INVENTION

The invention relates to methods and apparatus for operating radio access networks and core networks of wireless communication systems, and more particularly to methods and apparatus by which different networks can share resources.

ART BACKGROUND

One desired goal of cellular network operators (which we may also refer to as "service providers" or "operators") is to be able to provide uninterrupted services with quality and efficiency to as many mobile customers as possible. To approach this goal requires a favorable balance among customer experience and satisfaction, network performance, and costs.

One way for operators of different networks to improve performance and reduce their capital and operating costs is to share resources. That is, a given network is unlikely to use 100% of its resources 100% of the time. Therefore, there is an opportunity for different networks operating in a given geographical area to pool some of their respective resources to achieve greater overall efficiency. This can, for example, reduce the rate of outages and increase the effective network capacity and RF coverage without deploying more base stations.

However, there are still commercial and technical barriers to the achievement of large-scale resource sharing among cellular operators. Accordingly, there remains a need for methods of resource sharing that are technically and commercially feasible.

SUMMARY OF THE INVENTION

We have developed such a method.

In an embodiment, an MME in a network, or other similar network entity, analyzes KPIs from the cells it serves and based on the KPIs, it decides to engage in sharing. The, e.g., MME then contacts a sharing entity (SE) to announce that it wants to supply spectrum. The MME obtains terms of a sharing agreement from the SE and the MME obtains the identity of the other network. In response to this information, the MME configures its base stations to support the supplying of spectrum to the further operator according to the terms of the sharing agreement. The SE applies knowledge of network topology and of services offered. This knowledge is obtained from a sharing database. The sharing database is compiled from information that the SE obtains from the MMEs. The sharing database may be updated when, e.g., new base stations go online. At the expiration of the sharing agreement, the SE tells the MME to deactivate the sharing agreement.

We note in this regard that at least in LTE networks, the MME is a particularly advantageous choice as the control plane (C-plane) hub between the radio access network (RAN) and the evolved packet core (EPC) for the purposes described here, because under existing standards, it already occupies a privileged position in the network, where it manages the assignment of network resources and all other control-plane functions related to subscriber and session management.

In embodiments, the MME sends information to at least one base station, identifying one or more carriers to be released by at least one sector for sharing. The MME causes such base station or stations, without service disruption, to migrate mobile terminals off of the carriers that are to be released, and it notifies the SE of the released carriers. A "carrier" in this regard is any contiguous band of operational spectrum.

In embodiments, the MME identifies a partition of the total spectrum allocated to the sharing sector between shared spectrum and unshared spectrum, and it causes the base station to migrate mobile terminals onto one or more carriers belonging to the unshared spectrum. "Shared spectrum" in this regard is spectrum that is potentially subject to a sharing agreement, and which thus can be partitioned between spectrum that is temporarily released to a borrowing network and spectrum that is retained for use by the network that owns it. "Unshared spectrum," by contrast, is not subject to the sharing agreement. Mobile terminals can be migrated onto the unshared spectrum if it contains a sufficient bandwidth of empty carriers.

In embodiments, if too few mobile terminals can be migrated onto the unshared spectrum, the MME partitions the shared spectrum between released spectrum and retained spectrum, and it causes the base station to migrate mobile terminals off of the released spectrum and onto one or more carriers belonging to the retained spectrum.

In embodiments, before the RAN is configured, the MME causes the base station to place the mobile terminals of the sharing sector or sectors into a temporary Suspend state in which no user-plane or control-plane communication takes place between the mobile terminal and the RAN.

In embodiments, the MME or similar network entity obtains KPIs that include measurements of uplink and downlink Interference-over-Thermal (IoT). The, e.g., MME decides to make a sharing attempt based on the KPIs, wherein the sharing attempt is an attempt to borrow spectrum, and it selects favorable spectrum for sharing. Further, the, e.g., MME announces the sharing attempt and the selected spectrum to an SE, obtains from the SE the identity of at least one operator willing to supply spectrum and the terms of a sharing agreement with the further operator, and configures the RAN to support the borrowing of spectrum from the supplying operator according to the terms of the sharing agreement.

In embodiments, the, e.g., MME further makes a determination, based on the IoT measurements, whether there is too much interference to proceed with the borrowing attempt in at least one sector, and in response to a determination that there is too much interference, it configures the RAN for reduced transmission power in at least one said sector.

In embodiments, several modules are provided, which cooperate to bring about results as described above. A "module" in this regard may be a specialized circuit or combination of circuits, or it may be a set of instructions recorded in a machine-readable memory, together with general-purpose or special-purpose circuitry capable of carrying out the recorded instructions. Thus, for example, a module is configured for obtaining key performance indicators (KPIs) from one or more cells served by a wireless core network that controls at least one radio access network (RAN) and is operated by at least a first operator. A further module is configured for formulating attempts to share spectrum based on the KPIs. A module is configured for announcing sharing attempts to a sharing entity (SE) embodied in a processor connected to the wireless core network and for obtaining from the SE the identities of further operators and the terms of sharing agreements with the further operators. A still further module is configured for configuring the RAN to support borrowing of spectrum from further operators and/or to support supplying of spectrum to further operators according to the terms of sharing agreements.

DETAILED DESCRIPTION

For purposes of illustration, we will describe embodiments of our invention with specific reference to LTE networks. However, such choice of network technology should be understood as merely illustrative, and not as limiting. In fact, our ideas are usefully employed in various other network technologies, such as WiMAX.

Figure 1:
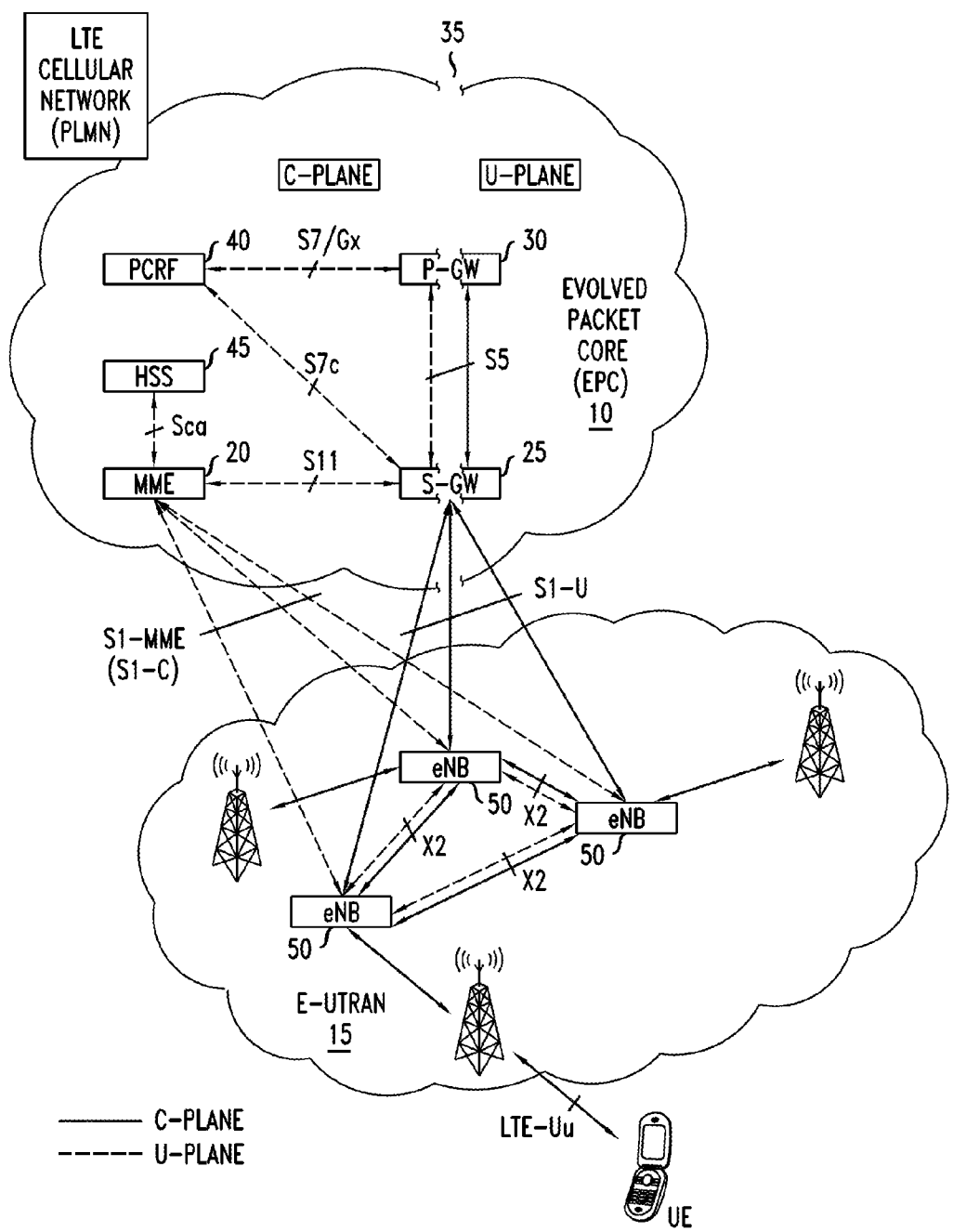
FIG. 1 is a schematic diagram illustrating the architecture of an LTE network of the prior art.

A brief description of LTE networks will now be provided with reference to FIG. 1.

LTE ("Long Term Evolution") is a Fourth Generation mobile cellular network technology that is evolved from UMTS, and that includes an all-IP networking architecture. LTE is being introduced through a series of releases by the 3rd Generation Partnership Project (3GPP). In LTE, the architecture of the GPRS core network is replaced by the System Architecture Evolution (SAE), which is a flat, IP-based network architecture. Because LTE is all-IP from end to end, the mobile handsets and other terminal devices for LTE have embedded IP capabilities, and the base stations, referred to as Evolved NodeBs (eNodeBs) are IP-based.

As seen in FIG. 1, the LTE system architecture includes core network 10, referred to as an Evolved Packet Core (EPC), and radio access network 15, referred to in LTE as an Evolved UTRAN (E-UTRAN). The entities in the E-UTRAN and EPC are interconnected via standardized IP-based interfaces.

With further reference to the figure, the EPC will be seen to include MME (Mobility Management Entity) 20, Serving Gateway (S-GW) 25, and Packet Gateway (P-GW) 30. The MME performs the signaling and control functions to manage the access by the mobile user terminals (referred to in LTE as UEs, for "user equipment") to network service. The MME also manages the assignment of network resources, and it manages the mobility states to support tracking, paging, roaming, and handovers. The MME also manages all other control-plane functions related to subscriber and session management.

The S-GW is a data plane element. Its primary function is to manage user-plane mobility and to act as a demarcation point between the radio access network (RAN) and the core networks. The SGW maintains data paths between eNodeBs and the P-GW.

The P-GW is the termination point of the packet data interface toward the packet data networks. As such, it is the entry and exit point for traffic for the UEs. The P-GW supports operator-defined policy for resource allocation and usage, packet filtering, and charging.

One feature of the EPC is a clear separation between the Control-plane (C-plane) and User-plane (U-plane) interfaces. This is advantageous because it allows independent scaling of the two planes in order to manage their latency performances. The C-plane includes interfaces to carry the user mobility, authentication and policies, entity configuration and OAM (Operation Administration and Management) related messages, whereas the U-plane interfaces carry user traffic. Expansion of the C-plane depends on the number of mobile terminals and their mobility patterns. Expansion of the U-plane depends on the aggregated data throughput requirements. As will be seen, the separation between these planes can facilitate capacity sharing among different LTE cellular networks.

The separation between the C-plane and the U-plane is delineated in FIG. 1 by conceptual boundary 35. It will be seen that on the control side of the boundary, there are two further network entities: PCRF 40 and HSS 45.

The PCRF supports service data flow detection, policy enforcement, and flow-based charging. (In LTE, a service data flow—SDF—is the virtual connection that carries data-plane traffic.) The HSS ("Home Subscriber Server") is a user database that supports the network entities that handle calls. The HSS contains subscription-related information such as subscriber profiles. It authenticates and authorizes users, and supports mobility management, call establishment, and IP session establishment. In its various functions, the HSS combines the earlier HLR ("Home Location Register") and AuC ("Authentication Center").

One significant feature of the E-UTRAN is a relatively flat architecture in which the radio network controller (RNC) and the Base Station Transreceiver (BTS) functionalities are integrated into a single entity, namely the eNodeB (eNB). The eNBs in FIG. 1 are designated by the reference numeral 50. As seen in the figure, the eNB manages three interfaces: It communicates with the EPC on the S1 (S1-C and S1-U combined) interface, it communicates with other eNBs on the X2 interface, and it communicates wirelessly with the UEs on the over-the-air (OTA), LTE-Uu interface.

Via the X2 interface, the eNB is fully connected to all other eNBs in the E-UTRAN. The X2 interface is designed to support user data (U-plane) forwarding from one eNB to another in handover operations and also to manage co-channel interference among eNBs using C-plane communication messages. Thus, the fully connected eNB is evolved into a cellular network edge router. As such, it uses the three interfaces to route data to its destinations, which include the other eNB, the EPC, and the UEs. As will be seen, the flat E-UTRAN and the eNB edge router can facilitate the dynamic sharing of the E-UTRAN and eNB with other LTE cellular networks.

Figure 2:
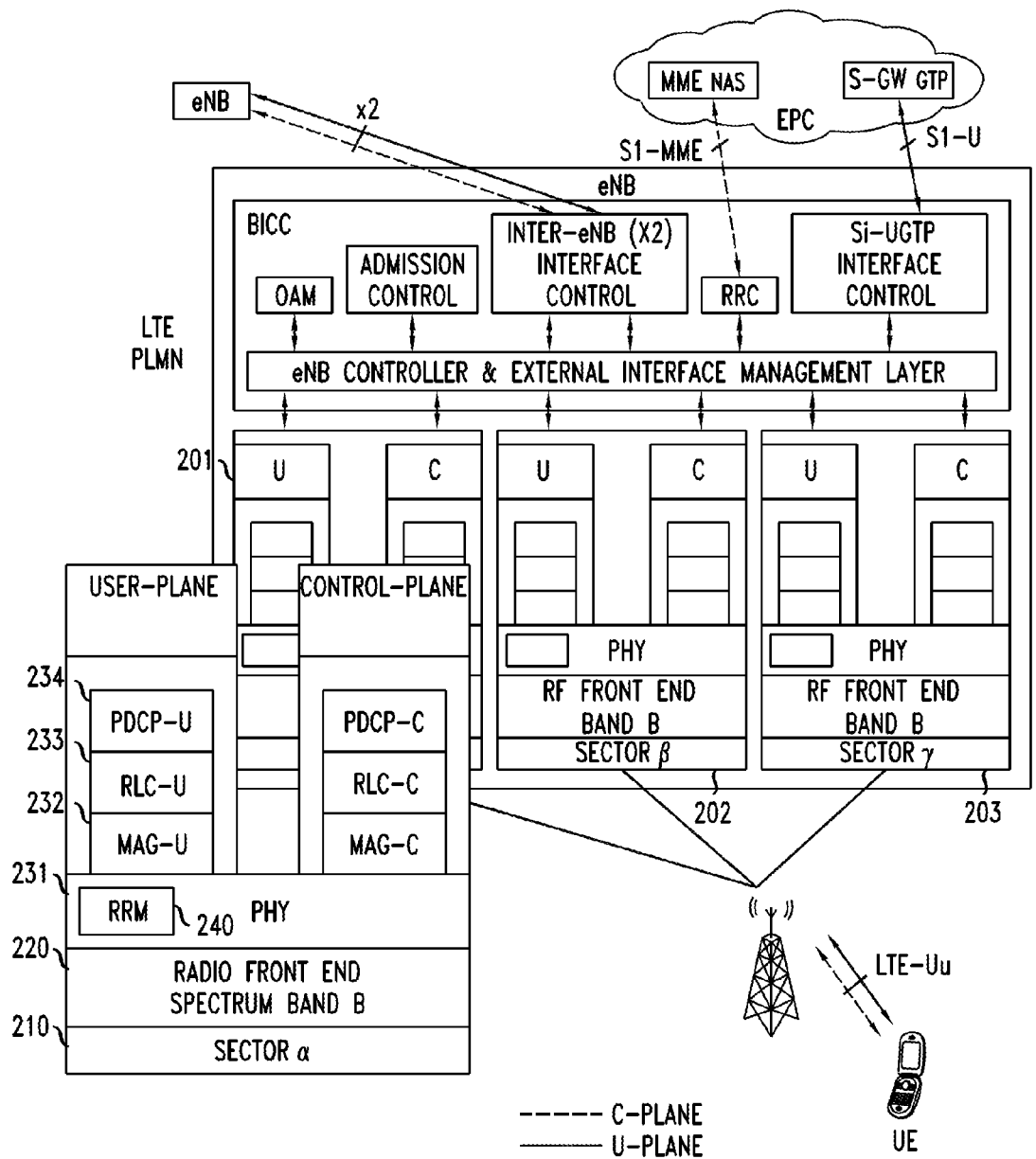
FIG. 2 is a conceptual block diagram of a typical eNodeB of an LTE network of the prior art.

FIG. 2 is a conceptual block diagram of a typical eNB of an LTE network, which is owned and operated by one single operator of an LTE Public Land Mobile Network (PLMN). As seen in the figure, the eNB has three antenna sectors 201, 202, and 203, which are respectively designated as sector α, sector β, and sector γ. The figure includes an expanded view 210 of sector α. For clarity, we note that in the nomenclature of the 3GPP standards, a sector of the eNB is referred as a cell. Herein, we will use the terms cell and sector interchangeably to refer to a sector of an eNB.

Each sector has an RF front end 220 that can be configured to operate on a carrier or a channel, designated in the figure as Spectrum Band B, that may be defined, e.g., by its center frequency and bandwidth. Separately implemented within each sector are the Physical Layer (PHY) 231, Medium Access Control Layer (MAC) 232, Radio Link Control Layer (RLC) 233, and Packet Data Control Protocol Layer (PDCP) 234. The PHY, MAC, RLC and PDCP layers together constitute LTE Layer 1.

The physical layer of the LTE air interface (LTE-Uu) uses Orthogonal Frequency Division Multiple Access (OFDMA) scheme on the downlink (DL), and it uses the Single Carrier Frequency Division Multiple Access (SC-FDMA) scheme on the uplink (UL). These FDMA schemes enable LTE to flexibly support the use of multiple carrier bandwidths, which typically include 1.4, 3, 5, 10, 15 and 20 MHz. LTE supports frequency division duplex (FDD) and time division duplex (TDD), and it also supports discontinuous spectrum aggregation.

The physical layer frame format is 10 ms long and contains ten sub-frames of 1 ms each. Each sub-frame can carry fourteen OFDM symbols. In frequency, each OFDM symbol spans twelve subcarriers, each having a bandwidth of 15 kHz.

In LTE, the minimum unit of scheduling on both the uplink and the downlink is a frequency-time block referred to as a Physical Resource Block (PRB) or Resource Block (RB). In our exemplary implementation, the minimum unit of scheduling is a PRB that consists of fourteen OFDM symbols spanning the twelve subcarriers referred to above, thus spanning 1 ms of time and a total of 180 kHz of bandwidth. Accordingly, the 1.4, 3, 5, 10, 15 and 20 MHz bandwidth options on the uplink and downlink channels correspond to 6, 15, 25, 50, 75 and 100 PRBs, respectively. Those skilled in the art will recognize that our PRB is an aggregation of two RBs as defined in the LTE standard. However, it should be noted that generalizations to PRBs that aggregate other numbers of RBs are readily achieved and not excluded from the scope of the present invention.

Within the physical layer, a functionality 240 referred as the Radio Resource Management (RRM) performs the mapping between the logical channels and physical channels. The RRM also schedules the various UEs and their services in the uplink and downlink according to their respective priorities, and it makes the selections of Modulation and Coding Scheme (MCS). In implementations of the invention as described below, the RRM also measures the level of resource (i.e., PRB) utilization. This is an example of a key performance indicator (KPI) on the basis of which a decision whether or not to share may be made.

As is well-known, control information of various kinds is broadcast by the eNodeB. The control information broadcast by each sector includes a Master Information Block (MIB) and as many as thirteen different System Information Blocks (SIBs). The MIB and the SIBs are Radio Resource Control (RRC) messages. The MIB is sent on the Primary Broadcast channel (PBCH). The SIBs are sent in the secondary logical broadcast channel carried by the Physical Downlink Shared Channel (PDSCH).

The System Information Block Type 1 (SIB1) contains a parameter referred to as PLMN-id, which identifies the particular network. It should be noted in this regard that the same network operator may operate in different regions under different values of the PLMN-id. However, in the context of the resource sharing that is to be described below, when two networks have different PLMN-ids, they should be understood as networks under different operators, sharing at least part of a common geographical area.

The System Information Block Type 3 (SIB3), System Information Block Type 4 (SIB4) and System Information Block Type 5 (SIB5) contain cell re-selection information and neighbor lists for use in handover operations.

We will now discuss some basic features of cellular network resource sharing as we envisage it.

Parties of various types may participate in resource sharing. One type of party is the established network operator, such as those that currently provide brand name service to large customer populations. Another is a third party that owns and controls cellular resources but is not a network operator. Such a party may be viewed as a resource broker that, e.g., controls spectrum or builds E-UTRANs and leases them to LTE operators. One example might be a direct TV (DTV) operator leasing whitespace to cellular operators. The third type of party is neither an operator nor an owner of resources, but instead may borrow resources in order to become an operator. For example, any of the well-known content providers might at some point wish to operate its own cellular network. To do so, it would borrow resources, i.e., spectrum and hardware, from third parties.

In the sharing scenarios that we will describe below, we introduce a new network entity that we refer to as the Sharing Entity (SE). The SE is an independent entity owned and operated by either a third party or an alliance of cellular network operators who want to take part in resource sharing activities. It coordinates supplies and demands between prospective sharing partners. The sharing partners are different networks, acting through their respective MMEs, that have excess resources to offer for sharing (supplies), or that are requesting, on a temporary basis, a grant of resources from other networks (demands). The MMEs (acting as sharing partners) and the SE (acting as coordinator) take part in a negotiation process, the outcome of which may be a finalized sharing agreement between PLMNs. As will be explained below, the SE also manages the sharing agreements.

Physically, the SE may be deployed as a server hosted by a suitable computing device that is situated at any network node from which it can communicate with the MMEs of the sharing partner networks. Often, it will be advantageous to deploy the SE within a core network. The SE may be hosted, for example, on equipment belonging to a third party or to an alliance of network operators. The SE may alternatively be hosted, on the same machine that hosts a network's MME, although such an option may be less desirable when it is important for the SE to be an independent entity.

Figure 3:
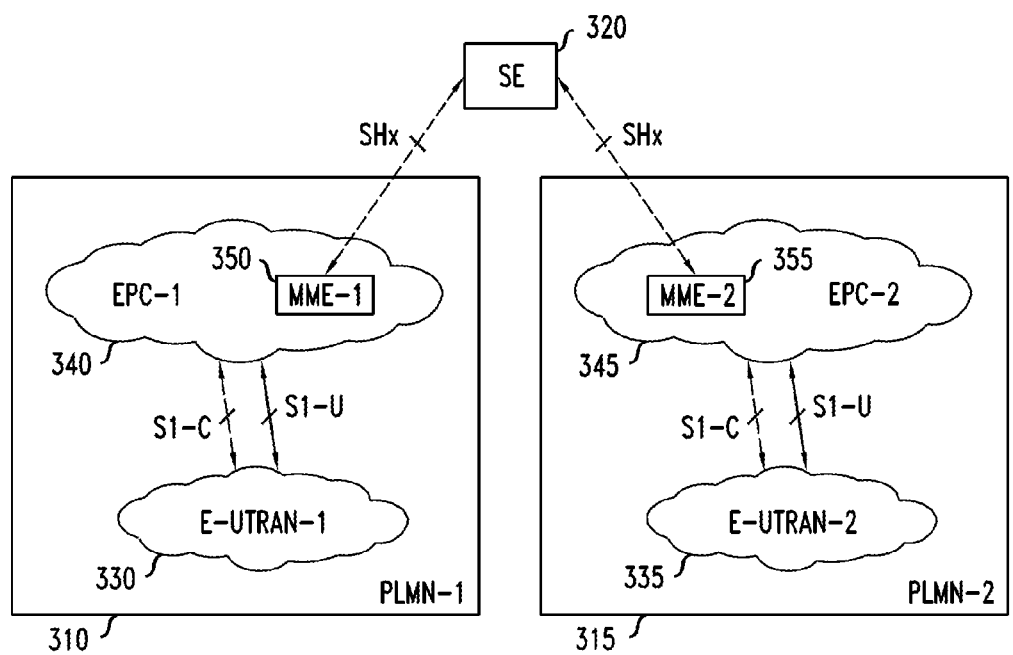
FIG. 3 is a schematic representation, at a high level, of an exemplary architecture in which two LTE networks are operated by two different operators and are candidates for resource sharing with the support of a sharing entity in accordance with an embodiment of the present invention.

FIG. 3 schematically depicts, at a high level, an exemplary architecture in which two LTE networks 310 and 315, denominated PLMN-1 and PLMN-2 in the figure, are operated by two different operators and are candidates for resource sharing with the support of SE 320. As seen in the figure, each network has a respective radio access network 330, 335 and a respective core network 340, 345. Within the core networks are respective MMEs 350, 355. As seen in the figure, each MME communicates with the SE over an IP-based control-plane interface that we have named the SHx interface.

As noted above, the MME serves, on behalf of its network, as the control and decision-making entity for the sharing operations. The MME initiates resource sharing as the representative of its PLMN operator. In particular, it signals to the SE, over the SHx interface, its willingness to engage in a sharing agreement with the other PLMN. The sharing architecture as illustrated is readily extensible to a sharing architecture in which three or more MMEs from different networks connect to the SE and take part in multilateral resource sharing.

In typical scenarios, one SE will be deployed per market, where it will manage all of the neighborhoods that collectively compose the market. "Market" in this regard means the coverage area of an EPC. Thus, for example, a large suburban county might correspond to a market, and its various townships might then be its constituent neighborhoods. Each neighborhood will typically be served by multiple eNBs, and we assume that it will also be served by multiple carriers. Typically, each LTE network operator will assign one MME to a given market to control the eNBs deployed in that market. Since more than one operator may be active in a given market, the market may include multiple MMEs and multiple E-UTRANs, each belonging to a respective operator.

Cellular network resources that may potentially be shared include hardware, spectrum, and capacity. The approach to be described here is directed to spectrum sharing. We have described a new approach to network capacity sharing in our U.S. patent application Ser. No. 13/253,120, filed on Oct. 5, 2011 by M. Buddhikot and J. Panchal under the title "Dynamic Resource Sharing among Cellular Networks," which is commonly assigned herewith, and which will be briefly discussed below.

Figure 4:
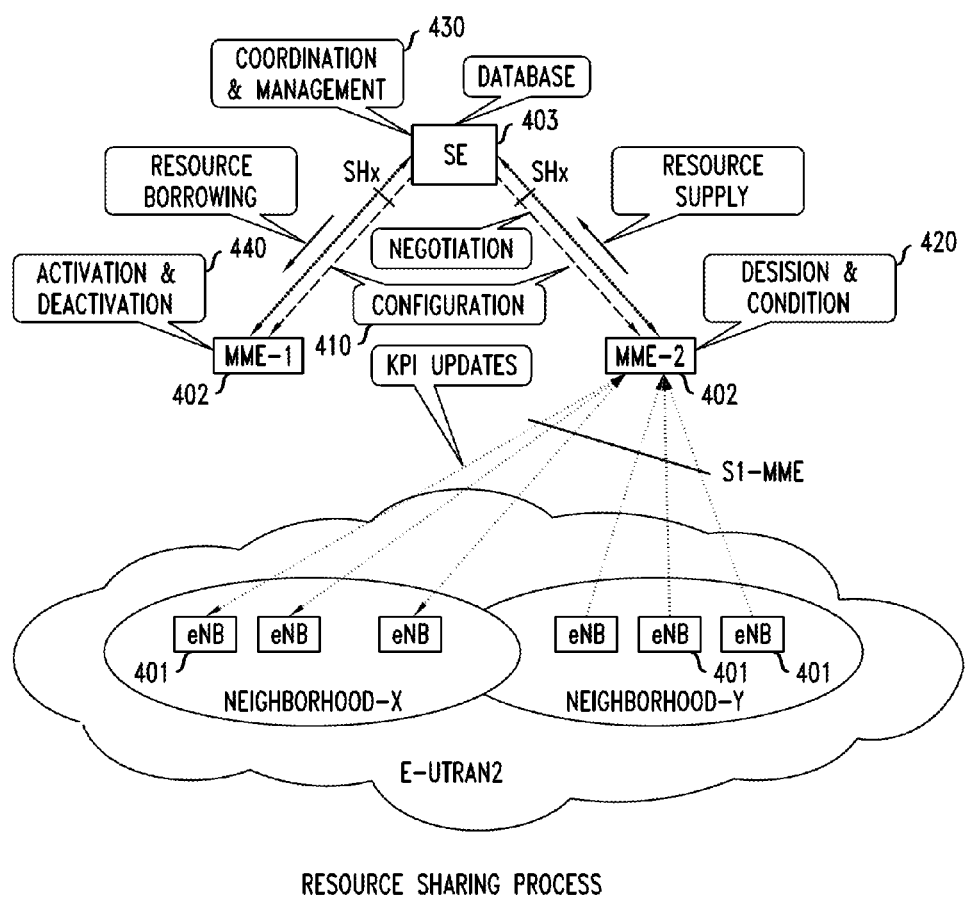
FIG. 4 is a conceptual representation of a sharing process in accordance with an embodiment of the present invention.

FIG. 4 is a conceptual depiction of a sharing process involving eNBs 401, MMEs 402, and the SE 403. The purpose of the process is to create, modify, and dissolve sharing agreements dynamically. In support of that purpose, subsidiary processes activate and deactivate network interfaces and update configurations of network entities such as eNBs.

The sharing process includes four tasks: Configuration 410; Decision and Condition 420; Coordination, Negotiation, and Management 430; and Activation, Deactivation, and Reactivation 440. Each task is discussed, in turn, below.

Configuration.

This task establishes SHx interfaces between the MMEs belonging to various LTE networks and the SE. The SE uses the SHx interface to collect information from the MMEs to build a sharing database. The sharing database contains topological information related to E-UTRANs (including, specifically, the eNBs) and MMEs in the market. The topological information includes among other things the locations and neighborhoods of the network entities, and the types of wireless services available in the market. The Configuration task runs periodically to update the database when there is any change in topology or any other change in items related to the sharing database.

Decision & Condition.

This task has multiple components distributed among the eNBs, the MMEs, and the SE. One of the components involves measuring or estimating Key Performance Indicators (KPIs). The KPIs are used as input for making sharing decisions. Some of the KPIs that may be useful for that purpose are spectral efficiency, traffic loading, number of active users, spectral utilization or capacity (in terms of radiofrequency bandwidth, for example), co-channel interference, wireline backhaul bandwidth utilization, call-drop statistics, call-blocking probabilities, processor occupancies of various network elements, core network outage rates, and packet drop rates at various network entities. Network elements such as the eNBs measure or estimate the pertinent KPIs and observe their long-term and short-term statistics to assess the performance of the cellular network.

KPIs such as those listed above are conventionally used by operators to drive RF coverage and RAN expansion, spectrum capacity improvement, core network expansion, and other initiatives. However, those skilled in the art will readily appreciate that such KPIs can also be used to make dynamic resource-sharing decisions. Thus, according to one example which is meant to be illustrative but not limiting, one particular KPI, namely the RF bandwidth utilization, may be chosen as the pertinent KPI for making the sharing decisions. Of course in other implementations, other KPIs or combinations of KPIs may be chosen for the same purpose.

In our example, the cells measure their respective spectral utilizations, which they periodically send to the MME over the S1 interface. The MME collects and analyzes the KPIs for all neighborhoods, and it makes short-term and long-term sharing decisions. Once the MME decides to participate in resource sharing, it sends a message to the SE over the SHx interface. The message may be a borrowing request in which the MME (acting for its PLMN) demands additional resources, or it may be an offer of surplus resources that are available for sharing.

Because patterns of resource consumption in cellular networks change dynamically, a surplus resource such as spectrum, hardware, or overall network capacity should be understood statistically as a multi-dimensional random process which changes over time and space. Accordingly, the parameters specified in a sharing agreement will desirably include the nature of the shared resources (e.g. network capacity, which is the subject of the present discussion, but also possibly spectrum or hardware), the time period for sharing, and the geographical area for sharing. The time duration might be, for example, on the order of minutes, hours or days. It could also be made dynamically variable by the sharing partners, and renewable upon expiration. The geographical limitation might be, for example, to specified neighborhoods or markets. The sharing partners might optionally be able to dynamically activate or deactivate sharing in designated neighborhoods.

In at least some cases, it may be advantageous to specify the amount of resource that is to be shared in terms of a number of users. Whatever the measure of shared resources, the sharing network will generally hold back a reserve capacity so that sudden increases in demand can be accommodated.

The service dimension of the sharing agreement might also be changed dynamically. For example, the sharing partners might, by agreement, reserve the power to dynamically exercise admission control by blocking specified services from inclusion in the sharing agreement.

Various types of events might trigger the MME to issue a sharing message. In one example, the MME is configured with a statistical model of resource usage that takes into account the calendar date, time of day, day of week, and the like. Using historical data and observations of spectral utilization over a recent time window, the model predicts a pattern of resource usage over a period of time. One possible form, among many others, for such a prediction is: "With 90% certainty, spectrum in geographical region r will be utilized at no more than 50%, on average, with a variance of no more than 5%, for the next h hours." The response might be, e.g., for the MME to offer spectrum to geographical region r for h hours, in an amount that is 50% of available spectrum, less a reserve.

Coordination, Negotiation & Management.

This task is mainly carried out by the SE. It involves processing each sharing demand or sharing supply message that comes in from an MME, and coordinating the messages that arrive from different MMEs. It also involves negotiating the sharing agreements between PLMNs (acting through their respective MMEs) and managing the sharing agreements.

Using the sharing database, which may contain among other information a description of network topology and a list of services available in the various neighborhoods, the SE identifies sharing partners and makes them aware of each others' sharing proposals. The identification of potential sharing partners and the matching of offers with demands is based on the sharing conditions (such as the space and time conditions discussed above) specified by the respective MMEs. The SE matches supplying partners to demanding partners to create supply-demand partnerships. Such partnerships may be one-to-many, many-to-one or one-to-one.

The management of sharing agreements by the SE includes dissolving the agreements when the specified sharing periods expire, supporting the modification and termination of active agreements, and also extending agreements through renegotiation.

The negotiation of the sharing agreement may be carried out by any of various well-known protocols, in which the SE acts as the broker. In one simple example, the SE identifies a pair of potential sharing partners that are willing and able to conform to the sharing conditions. An offer passes from one party (the offeror) to the other (the offeree). The offeree may respond with an acceptance, a counteroffer, or a refusal. In the event of a counteroffer, the original offeror may likewise respond with an acceptance, a counteroffer, or a refusal. The exchange terminates when there is an acceptance, a final refusal, or a timeout. The SE then proceeds to another pair of potential sharing partners.

Activation, Deactivation & Reactivation.

This task is carried out by the MMEs. Once the sharing agreement is reached, the sharing partners (MMEs) configure and direct their network elements to activate necessary and special functionalities and interfaces to support the agreement. Specific actions taken by the network elements are discussed in detail below.

As discussed above, the SE is responsible for a proper closure of the sharing agreement. The agreement is dissolved after the agreed time period unless the period has been extended. (For example, some implementations might automatically repeat the offer-and-acceptance protocol between the current parties, with updated parameters, upon issuance of an expiration notice.) Upon expiration of the sharing time period, the SE informs the MMEs over the SHx interface that the sharing is being terminated. In response to the termination notice from the SE, the MMEs reconfigure and direct their network elements to deactivate sharing functionalities and interfaces.

The MMEs collect and analyze KPIs during the sharing period. Based on changes in KPIs, the MMEs may be able to prematurely terminate the sharing agreement, extend the sharing agreement beyond the initially agreed time period, or renegotiate the sharing agreement. Similarly, the MMEs may also respond to requests issued by the SE for modifications or extensions of the sharing agreement. The SE might issue such requests, for example, in response to information received from other potential sharing partners.

Before describing our new approach for spectrum sharing, we will briefly review some of the ideas concerning network capacity sharing that are described in our U.S. patent application Ser. No. 13/253,120, which was cited above. By capacity, we mean the cumulative serving capability of an entire cellular network or of a sub-network (such an an e-UTRAN) within the cellular network, as quantifiable by the number of subscribed and roaming customers.

In a broad sense, network capacity sharing may be viewed as an inter-operator load balancing scheme. In that scheme, an operator with a lightly loaded network helps to balance the overall traffic load within a market by accepting additional traffic from a heavily loaded operator on a dynamic basis, and by carrying the accepted load.

Conventional roaming among cellular networks may be thought of as a form of network capacity sharing. However, roaming access as currently practiced is mainly limited to areas that have intermittent coverage or that lack home coverage, so that in order to obtain wireless service, customers must perforce roam into other operators' networks. As will be explained below, we expanded the roaming concept by applying an open-network strategy that does not limit roaming to certain areas, but instead may in principle permit roaming at all points in the network.

To support an expanded concept of roaming, it is advantageous to have a new, broader type of inter-operator roaming agreement, enhanced protocols and procedures, and enhanced architectural and infrastructural features of the wireless network.

One procedure that is advantageously modified is the procedure as defined, e.g., in 3GPP, by which a UE makes a selection of the serving network and the serving cell. The standard procedure is described at 3GPP TS 25.304, "Evolved Universal Terrestrial Radio Access (E-UTRA) and Evolved Universal Terrestrial Radio Access Network (E-UTRAN)—User Equipment (UE) procedures in idle mode and procedures for cell reselection in connected mode," http://www.3gpp.org/ftp/Specs/html-info/25304.htm.

According to the conventional procedure, the UE (unless it is a cognitive UE exercising an open network strategy) must give priority to its home PLMN. But under an open network strategy according to some of our new ideas, a UE subject to a sharing agreement that is currently in force may instead apply the same priority all PLMNs involved in the sharing agreement. Accordingly, the UE is free to request access to, or to hand over to, a cell of any of the sharing partner networks.

In an exemplary open network strategy, each UE is provisioned with two or more PLMNs, including at least a Home PLMN and a Roaming PLMN. The provisioned PLMNs are given equal priority for access. Each UE is granted the freedom to select a cell affiliated to any of the equal-priority PLMNs for access based solely on channel quality, without discrimination among the various PLMNs. For such cell selection, channel quality may be signified by, e.g., RSRP or RSRQ.

Under such an arrangement (and given two or more PLMNs acting as sharing partners), the UE measures the radio channels from cells of all pertinent PLMNs. The UE then selects a serving cell with the best radio channel from any of the PLMNs for access or handover. One basis for choosing the "best" channel is provided by the RSRP; that is, the best channel is the one for which the RSRP is highest.

In alternatives to the open network strategy, the LTE radio access network (i.e., the UTRAN) may steer the UEs. In steering, the network signaling is used to transfer the UE from one network operator to another, e.g. temporarily or for the duration of the connection. Various strategies may be employed to support steering, including forcing handover of active UEs from one operator to another, broadcasting multiple operator identifiers, and updating neighbor lists to include base stations that serve UEs subscribing to multiple operators. In a further strategy, referred to as "measurement configuration", a UE periodically measures the received signal strength on certain channels from various base stations that can support it, and that may belong to different operators.

Configuration information may be broadcast on a control channel to identify the sharing partners to the UEs. This can be done whether or not an open network strategy is being employed. In LTE, for example, the necessary configuration information can be broadcast on the SIBs. In one possible implementation, for example, SIB1 is updated to contain the PLMN identities of all sharing partner networks. As a consequence, each affected UE perceives the cells (i.e., the eNBs) of each of the sharing partners as part of its own home network, and therefore as free to be selected for access or handover. In such an implementation, SIB3 and SIB5 may also be broadcasted with updates of the identities of the sharing partners for use in the selection and reselection of serving cells, and they may be updated with neighbor lists that are modified so as to support handover among the partner networks.

It should be noted in this regard that current 3GPP standards support so-called "measurement configuration", in which each of one or more specific UEs provides its own cellsite and neighbor cellsites with periodic or event-based RSRP measurement updates. By means of measurement configuration and other methods discussed above, the eNB that is currently serving a UE can acquire enough information to steer the specific UE to a different PLMN if the UE is eligible and circumstances warrant the transfer. Thus in a handover, for example, the UE will select a target eNB and will notify the target eNB that it has been selected. If the target eNB belongs to a PLMN that is a sharing partner, the PLMN of the target eNB will send confirmation to the source eNB.

Spectrum Sharing—General

We now turn to a description of our new architecture and techniques for spectrum sharing, in exemplary implementations. In the discussion below, we will describe implementations of our spectrum sharing architecture in the context of LTE networks. The ideas to be described here are applicable to LTE networks operating in the FDD mode as well as to those operating in the TDD mode. Moreover, our choice of LTE networks should be understood as illustrative and not limiting.

Initially, it should be noted that the types of spectrum resources that may be shared include licensed wireless service spectrum, spectrum that is unlicensed and commonly available, and spectrum that is licensed for non-cellular wireless services, which we refer to below as whitespace.

It will be understood that in the illustrative scenarios to be described below, the only networks that are active in borrowing spectrum are the LTE cellular networks. On the other hand, the source networks that supply the borrowed or shared spectrum may without limitation include other LTE networks, non-cellular wireless service networks such as DTV networks, and government-owned entities that act as spectrum brokers. Thus, for example, LTE networks may be suppliers of licensed cellular spectrum, whereas non-cellular service networks may supply licensed non-cellular spectrum, and government brokers may supply unlicensed cellular spectrum.

Figure 5:
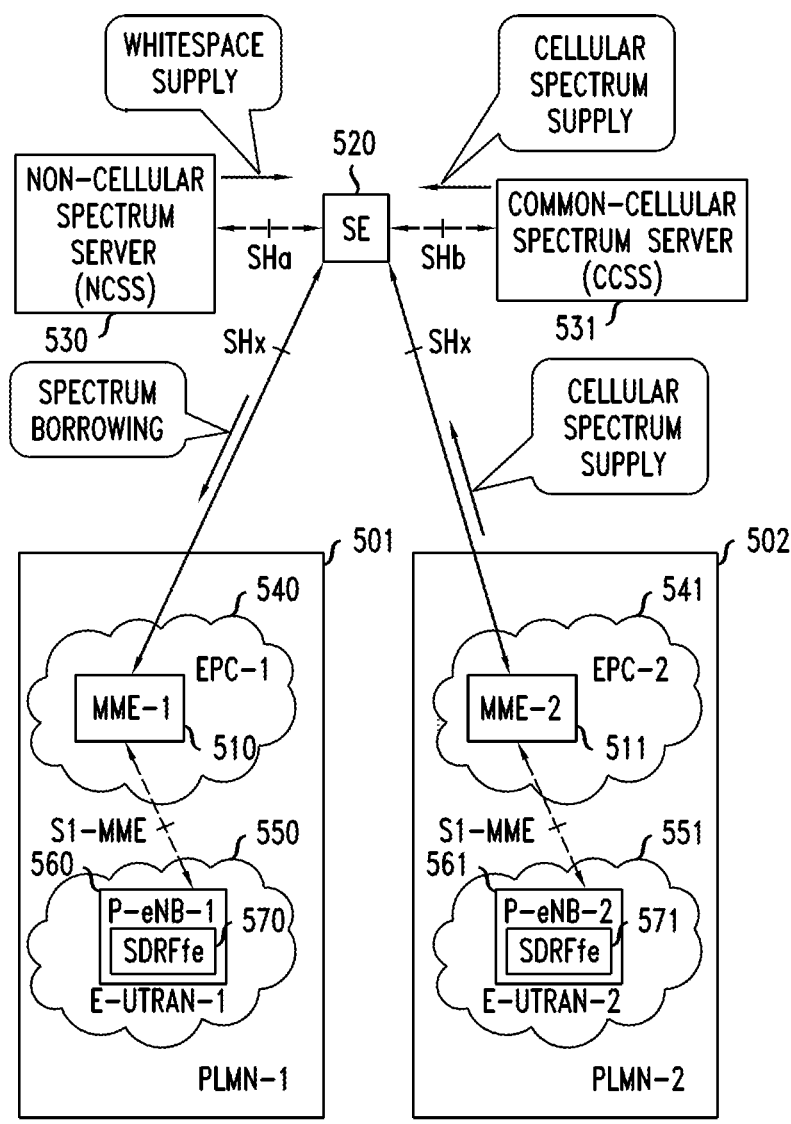
FIG. 5 is a schematic representation, at a high level, of an exemplary architecture in which two LTE networks are operated by two different operators and are candidates for spectrum sharing with the support of a sharing entity and base stations having software-defined programmable front ends in accordance with an embodiment of the present invention.

Turning now to FIG. 5, it will be seen that two LTE networks 501, 502 are shown, which are respectively designated PLMN-1 and PLMN-2 and respectively managed by operators op1 and op2. The spectrum sharing is initiated by an MME such as MME-1 or MME-2, respectively identified by reference numerals 510 and 511 in the figure, and it is coordinated by sharing entity (SE) 520.

Among other functions, the SE manages the secondary marketplace for the licensed cellular spectrum supplied by the MMEs of cellular supplier networks, as well as for whitespace and unlicensed spectrum. Sources of whitespace and unlicensed spectrum are respectively made available for transacting with the SE by servers 530 and 531, which are respectively designated Non-Cellular Spectrum Server (NCSS), and Common Cellular Spectrum Server (CCSS).

NCSS 530 supplies information on available whitespace to the SE over the SHa interface as shown in the figure. In some implementations, the NCSS may be part of an independent sensor network deployed for the detection of available whitespace.

In some implementations, the SE bears the further responsibility of controlling interference by disallowing the sharing of overlapping spectrum among multiple parties if the use of borrowed carriers by such parties is predicted to increase interference in the affected geographical region. For such purpose, one useful descriptor of the interference level is Interference Over Thermal (IOT). Use of IOT for interference control is discussed in greater detail below.

CCSS 531 supplies information on available unlicensed and commonly available spectrum to the SE over the SHb interface as shown in the figure. Common spectrum will typically be reserved and identified by a government regulatory authority, thus obviating any need to actively search for it. Indeed, the CCSS will typically be owned by the government authority.

As seen in the figure, each of the MMEs is embedded in one of two evolved packet cores 540, 541, which are respectively designated EPC-1 and EPC-2. Each of the evolved packet cores is shown in communication with a respective one of two access networks 550, 551, respectively denominated E-UTRAN-1 and E-UTRAN-2. The figure includes one representative base station 560, 561 in each access network, the base stations being respectively designated P-eNB-1 and P-eNB-2. The base stations are labeled in the figure as "P-eNodeB"s. The designation "eNodeB" is in accordance with LTE terminology. The prefix "P" indicates that the illustrated base stations are adapted to be programmable in a sense that will be further elaborated below.

With further reference to FIG. 5, it will be seen that each base station includes a software-defined programmable radiofrequency front end (SDRFfe) 570, 571. More generally, an SDRFfe will be provided for each sector or cell that is served by a P-eNodeB. Software defined radio (SDR) is a well-known technology that uses digital sampling and digital processing techniques to perform, in the digital domain, various functions that belong to the analog domain in conventional radio transmitters and receivers. Among other benefits, the use of digital techniques enhances the operator's ability to flexibly define frequency channels and to shift signals among channels. Accordingly, the SDRFfe is a radiofrequency front end that uses software defined radio to dynamically tune the operating frequency and dynamically define the operating bandwidth. Among other things, the frequency and bandwidth of the shared spectrum can thereby be specified and dynamically updated.

For example, a programmable radiofrequency (RF) front end supporting cellular spectrum might be programmed to support a plurality of channel bandwidths including the well-known standard LTE bandwidths of 1.4, 3, 5, 10, 15 and 20 MHz. It could also support discontinuous spectrum carrier aggregation so that each sector or cell of the P-eNB is capable of acquiring multiple, noncontiguous cellular spectrum bands and operating on them concurrently.

It should be noted that the current 3GPP standard does not support LTE operation on unlicensed spectrum and whitespace. As a consequence, borrowing of unlicensed spectrum and whitespace by an LTE-compliant network is precluded at present. However, sharing of cellular spectrum between a pair of LTE networks or operators could be possible under the present standard. We will now turn to a discussion of how inter-operator cellular spectrum may achieve practical realization.

Spectrum Division and Sharing—Illustrative Embodiments

We begin by considering the behavior of the supplier network during the Activation, Deactivation, Reactivation phase of the sharing process, which we have described above. It will be understood that communication between the MME and the eNodeBs with which it is associated takes place during this and other phases over the S1 interface, as noted above and as illustrated in FIGS. 1, 2, 4, and 5.

In order for the network to make a full or partial release of the shared spectrum, i.e., of the spectrum designated for inter-operator sharing, the MME of the supplier network will first check whether other operational carriers are available. If other carriers are found, the supplier MME will identify active UEs that are camped on the shared spectrum, and will redirect them to the other carriers. Procedures useful for this purpose are described, e.g., in the standards document 3GPP TS 36.331, "Evolved Universal Terrestrial Radio Access (EUTRA) and Evolved Universal Terrestrial Radio Access Network (EUTRAN)—Radio Resource Control (RRC) protocol specification," http://www.3gpp.org/ftp/Specs/html-info/36331.htm.

If no carriers are available, the supplier MME will initiate a process that we refer to as Spectrum Division and Sharing. The purpose of this process is to divide fully allocated but underutilized spectrum in such a way that a portion of it ("partial" spectrum) can be retained to serve the active UEs on the supplier network, while emptying the rest of the spectrum so that it can be released for sharing. Software defined radio is helpful in implementing this process because of the flexible manner in which it can define multiple frequency bands having various bandwidths.

After the spectrum has been divided, the retained spectrum is reconfigured. For example, let us suppose that during a given time period, the utilization of a 20 MHz wide band of LTE spectrum is found to be one-fourth the capacity of the band. In view of this, the operator decides to retain only 5 MHz of the spectrum, and to release the remaining 15 MHz to other operators in a neighborhood. As a consequence, the eNBs operating on the 20 MHz spectrum in the neighborhood will now need to be reconfigured to operate on the retained 5 MHz of bandwidth.

So that such a reconfiguration of spectrum can be performed without disrupting service, the supply sectors, i.e., the affected sectors of the spectrum-supplying network, will temporarily bar acceptance of new calls by, e.g., setting the barred flag in the SIB1 broadcast message as described in the standards document 3GPP TS 36.331, "Evolved Universal Terrestrial Radio Access (EUTRA) and Evolved Universal Terrestrial Radio Access Network (EUTRAN)—Radio Resource Control (RRC) protocol specification," cited above. Similarly, acceptance of handovers will also be temporarily barred.

All active UEs in the sharing supply sector that are registered to the spectrum-supplying operator are interrupted temporarily, and they are directed to resynchronize to their current serving cell on the retained 5 MHz spectrum, after division of the retained spectrum from the original 20 MHz spectrum. Concomitant with the reduction in channel bandwidth from 20 MHz to 5 MHz, the time-frequency locations of the physical channels will also change; that change must be communicated to the active UEs.

LTE networks as currently implemented do not support dynamic spectrum reconfiguration without service disruption as described here. We will therefore provide one example of an enhancement to LTE operations that can provide the needed support.

Figure 6:
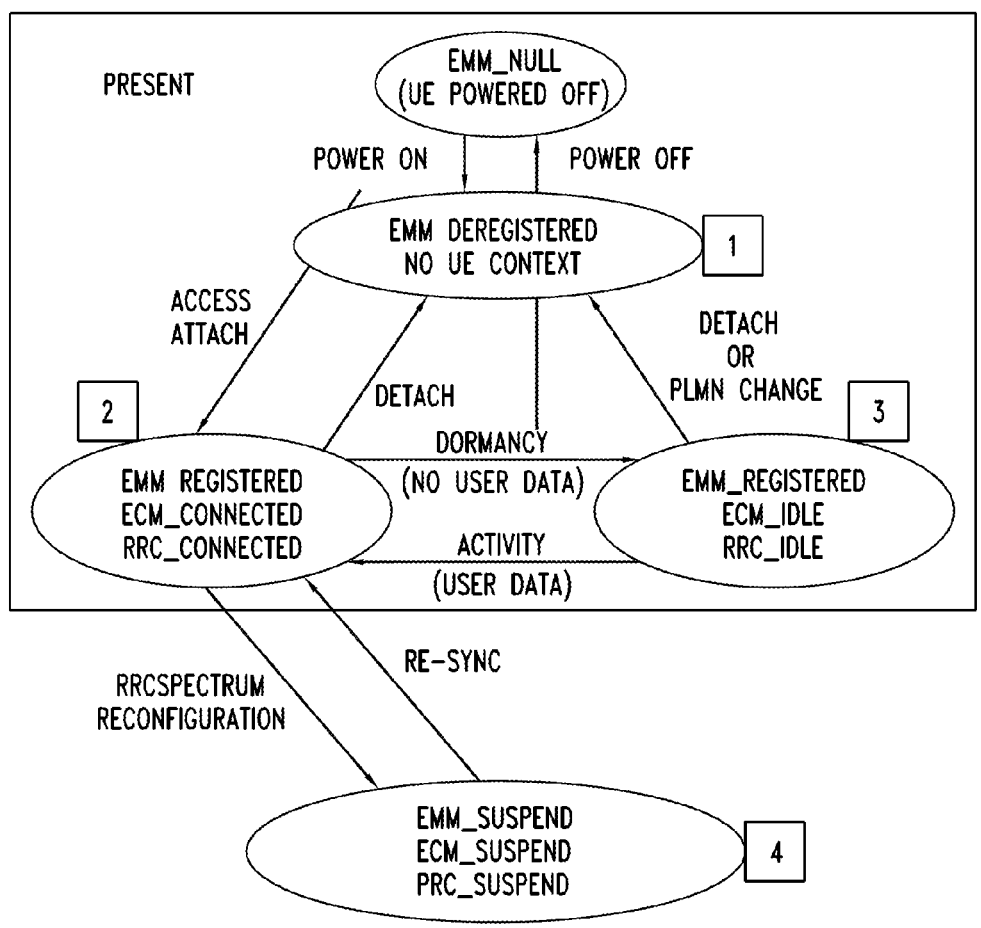
FIG. 6 is a symbolic representation of LTE network operations in the form of a state machine. The figure includes new enhancements that are intended to support radio spectrum reconfiguration in accordance with aspects of the present invention.

Turning to FIG. 6, it will be seen that LTE operations under the current standards may be represented as a state machine having a plurality of states and transitions between states. As seen in the figure, the states supported under current standards include several Radio Resource Control (RRC) states, several EPS Connection Management (ECM) states, and several EPS Mobility Management (EMM) states. These states are managed collectively by the UE, E-UTRAN (including eNodeB) and EPC (including MME) entities. Each state listed in the figure is a state of a respective one of several network entities, relative to one given UE. As represented in the figure, the states of the individual network entities are grouped into collective states numbered 1-3, each of which corresponds to one of the possible states of the given UE, and a newly introduced collective state denoted by the numeral 4, which will be described below.

More specifically, collective state 1 is the Power Down state. It is a transitory state, entered when the UE is turned on, during which the EPC is (briefly) unaware of the UE. Collective state 2 is the Active state, during which the UE is connected to the network and is participating in uplink and downlink data transfers. Collective state 3 is the Dormant state, in which the network is aware of the UE, but there is no transfer of data between the UE and the eNodeB.

The RRC states, which are respectively identified in the figure as RRC_IDLE and RRC_CONNECTED, represent downlink and uplink connectivity between the eNodeB and the UEs. In RRC_IDLE, the UE has no active radio channel to the eNodeB. In RRC_CONNECTED, by contrast, the UE and eNodeB are connected.

The ECM states, which are respectively identified in the figure as ECM_IDLE and ECM_CONNECTED, represent the signaling connectivity between the UEs and the EPC. In ECM_IDLE, there is no connectivity between the UE and the EPC. In ECM_CONNECTED, by contrast, there is active signaling connectivity between the UE and the EPC.

The EMM states, which are respectively identified in the figure as EMM_DEREGISTERED and EMM_REGISTERED, represent the mobility status of the UEs resulting from a mobility management procedure, such as Tracking Area Update (TAU) as described in the 3GPP standards document 3GPP TS 36.300, "Evolved Universal Terrestrial Radio Access (EUTRA) and Evolved Universal Terrestrial Radio Access Network (EUTRAN)—Overall description," http://www.3gpp.org/ftp/Specs/htmlinfo/36300.htm. In EMM_

DEREGISTERED, the MME does not know the location of the UE, whereas in EMM_REGISTERED, the MME knows the location of UE with sufficient confidence for pages to be sent to the UE.

We will now describe exemplary enhancements which are intended to support dynamic spectrum reconfiguration. We add a set of new states that we collectively designate SUSPEND states. The collective SUSPEND state is identified by reference numeral 4 in the figure. As seen there, the SUSPEND states are EMM_SUSPEND, ECM_SUSPEND, and RRC_SUSPEND. The process of suspending the UE is similar to the discontinuous reception (DRX) process which is described in the standards document 3GPP TS 36.331, "3rd Generation Partnership Project; Technical Specification Group Radio Access Network; Evolved Universal Terrestrial Radio Access (E-UTRA); Radio Resource Control (RRC); Protocol specification", and also in the standards document 3GPP TS 36.331, "3rd Generation Partnership Project; Technical Specification Group Radio Access Network; Evolved Universal Terrestrial Radio Access (E-UTRA); Medium Access Control (MAC) protocol specification," 3gppprotocol.com/web documents/36321-930-eutra-mac-proto.doc. However, our new SUSPEND process requires the UE to be given sufficient information so that, upon waking up, it can migrate to the newly reconfigured (i.e. retained) spectrum on the same serving cell.

The process of spectrum reconfiguration begins after the MME receives a spectrum release request from the SE. The MME forwards the request to the supply sector. The supply sector, in cooperation with the MME, then initiates spectrum reconfiguration by transitioning the RRC into the RRC_SUSPEND state and sending a newly defined message, which we designate the RRCSpectumReconfiguration message, to all active UEs. The supply sector also requests the MME, together with the P-GW and S-GW, to suspend all exchange of mobility data and all signaling procedures relative to those UEs, and to transition into EMM_SUSPEND and ECM_SUSPEND.

Here, the RRCSpectumReconfiguration message is an extension of the RRCConnectionReconfiguration message, also referred to as the "Handover Command" message sent to the UE by a source cell to hand the UE over to a target cell. In addition to the contents of RRCSpectumReconfiguration message, the RRCSpectumReconfiguration message contains the center frequency and bandwidth (for example 5 MHz in the illustration provided above) of the reconfigured spectrum, and the time duration over which the mobility and signaling procedures are to be suspended. It is desirable for the suspension duration to approximate, as closely as possible, the data (i.e., user-plane) interruption duration experienced by the UE in intra-frequency LTE hard handover. Typical data interruption durations are tens of milliseconds.

The UEs treat the new RRC spectrum reconfiguration message as an order to temporarily suspend their connections to the eNodeB and to the EPC, and to transition into the SUSPEND states, i.e., into RRC_SUSPEND, EMM_SUSPEND and ECM_SUSPEND. In these SUSPEND states, the active UEs are in a temporary radio blackout, in which they do not receive pages, do not send any user-plane (U-plane) or control-plane (C-plane) messages to the E-UTRAN or to the EPC, and likewise do not receive any U-plane or C-plane messages from the E-UTRAN or the EPC.

During the blackout period, the cell reconfigures its RF front end, which may include, for example, changing the settings of radios, amplifiers, filters, and the like. The cell also updates the MIB and SIB messages, using known procedures, to reflect changes in the common radio resource configuration, specifically changes in the center frequencies and bandwidths of the reconfigured spectrum and in the locations of the Random Access Channel (RACH) on the reconfigured spectrum.

A UE will exit from its SUSPEND state when a specified suspension duration has expired. Care should be taken, however, that the eNodeB has reconfigured the spectrum before the UEs exit the SUSPEND state. After the suspension duration has expired, the UEs begin to decode the Physical Broadcast Channel (PBCH) and the Primary and Secondary Synchronization Channels (respectively P-SCH and S-SCH) and they begin to resynchronize to the reconfigured channel.

For resynchronizing and reconfiguring the UEs, the eNodeB can send out spectrum reconfiguration instructions in the form of a broadcast message (currently not defined in 3GPP) which is read and acted upon by all of the UEs. Such a broadcast message is not currently defined in 3GPP, but appropriate formats and content for such a message will be readily apparent to those skilled in the art. Such an approach is economical in its use of signaling overhead, but it may lead to contention among multiple UEs that are responding within the same time interval.

In a different approach presented here, the eNodeB individually directs the synchronization and reconfiguration of the UEs via point-to-point RRCSpectumReconfiguration messages that use a staggered approach to avoid collisions between UEs. That is, the suspension durations may be incrementally varied among the UEs, to assure that they will respond at different times. The random-access response (RAR) backoff times may also be used. A further measure for the avoidance of collisions is to use contention-free preamble IDs, which are well-known in the context of LTE contention-free handover procedure.

Once it has been synchronized, a UE will next send out an RRCSpectumReconfigurationComplete message, to confirm the reconfiguration to the eNodeB. This message is similar to the "Handover Complete" message that a UE sends to confirm a successful handover in LTE networks. With transmission of RRCSpectrumReconfigurationComplete, the UE transitions into the CONNECTED states. Also, as indicated by reference numeral of the figure, the eNodeB upon reception of the RRCSpectrumReconfigurationComplete message transitions its UE state (i.e., the state that it maintains for the given UE) to the RRC_CONNECTED state, and it informs the EPC and the MME to transition their states of the UE to ECM_CONNECTED and EMM_REGISTERED.

Those skilled in the art will appreciate that the overall spectrum reconfiguration process can be viewed as a special case of inter-frequency handover, but instead of handing over from a source cell to a different target cell, the UE hands over to the same cell (i.e. the source and target cells are the same) but on a newly reconfigured part of the carrier spectrum.

Because the UEs remain within the same tracking area during the spectrum reconfiguration, they are not required to re-register with the MME. Consequently, they are transitioned into EMM_REGISTERED directly from the EMM_SUSPEND state.

At the end of the radio spectrum reconfiguration process, the MME indicates the release of the underutilized portion (for example, 15 MHz out of 20 MHz in the above illustration) of the source spectrum to the SE. Then, the SE notifies the borrowing network of the (e.g., 15 MHz) spectrum release, and the borrowing network initiates spectrum acquisition process relative to the released spectrum. In the acquisition process, the borrowing MME initiates configuration of the selected cells to operate on the borrowed spectrum.

The Spectrum Division and Sharing process has an entirely analogous inverse process, which we refer to as "Spectrum Resolution and Integration". The Spectrum Resolution and Integration process is performed by the supply sector after the sharing agreement is dissolved.

Shared Spectrum Interference Control

One of the factors that can limit the RF coverage of the shared spectrum is co-channel interference. In LTE, because of frequency orthogonality within the cell, the co-channel interference has no intracell component. Hence, assuming there is a frequency reuse factor of 1, all co-channel interference in LTE is due to activity in surrounding cells. The uplink interference perceived by a cell is contributed by the active UEs in the surrounding cells; similarly, the downlink interference as perceived at the UEs is contributed by the surrounding cells.

The well-known techniques of Inter-cell Interference Control (ICIC) are used to manage interference in LTE networks. To establish operating parameters for ICIC generally requires load-sharing negotiations between eNodeBs over the X2 interface. However, such communication may be unavailable between eNodeBs that are situated in the same neighborhood but belong to networks of different operators. As a consequence, it is desirable to provide a mechanism for interference mitigation that does not rely on communication over the X2 interface.

In this regard, it is advantageous if, before borrowing any spectrum, a prospective borrowing network can receive assurance that interference on the borrowed spectrum will be low enough; i.e., will allow sufficient improvement in spectral efficiency and capacity to justify the borrowing. Accordingly, we will now describe a new control scheme, which we denominate a proactive (or pre-sharing) co-channel interference control scheme. According to this scheme, the borrowing network submits to the SE a sharing precondition that specifies the maximum permissible interference, as discussed above in regard to the Decision and Condition task of the Sharing Process.

For the purpose of the proactive co-channel interference control scheme, the co-channel interference is characterized by the well-known property Interference-over-Thermal (IoT). As noted above, the SE has access to a database of information characterizing the cells. The database may include spectrum allocations, antenna radiation patterns, antenna heights, azimuths, and tilt angles, and other information useful for building an RF coverage map over geographical space and frequency space. The map can be used to identify cells that are using the same spectrum, and to estimate the maximum IoT (max-IoT) on the jointly used spectrum. If the estimated max-IoT on the spectrum meets the sharing precondition of the borrowing network, the SE can make the spectrum available to the borrowing network for sharing.

In an alternative approach, the MMEs of the borrowing networks, before borrowing any spectrum, direct their cells to measure uplink IoT, and they direct their UEs to measure downlink IoT and feed their measurements back to the MMEs via the cells. The borrowing MMEs use the interference measurements to identify and negotiate for the most favorable spectrum for sharing. In this regard, the downlink IoT is a characterization, made based on the UEs' RSRP measurements, of the interference energy, above thermal noise, on the borrowed spectrum.

The total interfering energy is usefully estimated as the total RSRP, summed over those cells that are operating on the borrowing (i.e. shared) spectrum but are not themselves sharing parties. Advantageously, the MME constructs samples of such summed RSRP values based on received RSRP measurements from the UEs on the borrowing spectrum and from them, determines the worst case of downlink IoT. A maximum IoT can then be estimated as the greater of the maximum downlink IoT and the maximum uplink IoT.

In the event that the estimated maximum IoT is too high and thus fails to satisfy the spectrum sharing condition, there next is an attempt to reduce the estimated maximum IoT to an acceptable level by limiting the maximum downlink and uplink transmission powers in the borrowing sector on the borrowed spectrum. If that attempt fails, the borrowing process may be terminated.

As explained above, when a spectrum sharing agreement is activated in a neighborhood served by, e.g., two networks PLMN-1 and PLMN-2, a heavily loaded demand sector (or "borrowing" sector) can request additional spectrum from one or more lightly or moderately loaded spectrum supplying sectors (i.e., "supply" sectors) identified by the SE. As also explained above, LTE networks are susceptible to co-channel interference which arises when UEs receive undesired downlink transmissions from neighboring cells, and when eNodeBs receive undesired uplink transmissions from the UEs of neighboring cells.

Figure 7:
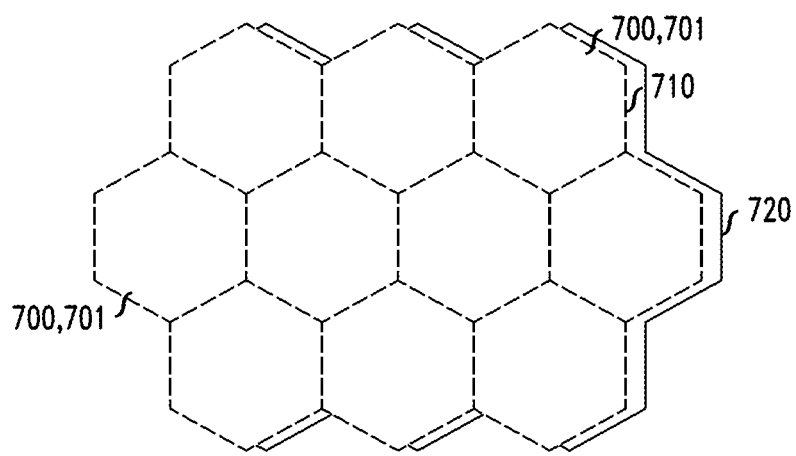
FIG. 7 symbolically illustrates a cellular topology in which the sectors of network PLMN-1 coincide with the sectors of network PLMN-2. For purposes of illustration, no distinction has been made in the figure between cells and individual sectors thereof.

FIG. 7 symbolically illustrates a cellular topology in which the sectors 700 of network PLMN-1 (reference numeral 710) coincide with the sectors 701 of network PLMN-2 (reference numeral 720). For purposes of illustration, no distinction has been made in the figure between cells and individual sectors thereof. In a topology of the FIG. 7 kind, where sectors belonging to different networks are geographically colocated, the SE will typically limit the choice of supply sectors so that a given demand sector can borrow spectrum only from a supply sector with which it is colocated. This limitation is desirable because otherwise, the borrowed spectrum can cause co-channel interference on the colocated sector of the supply network.

Figure 8:
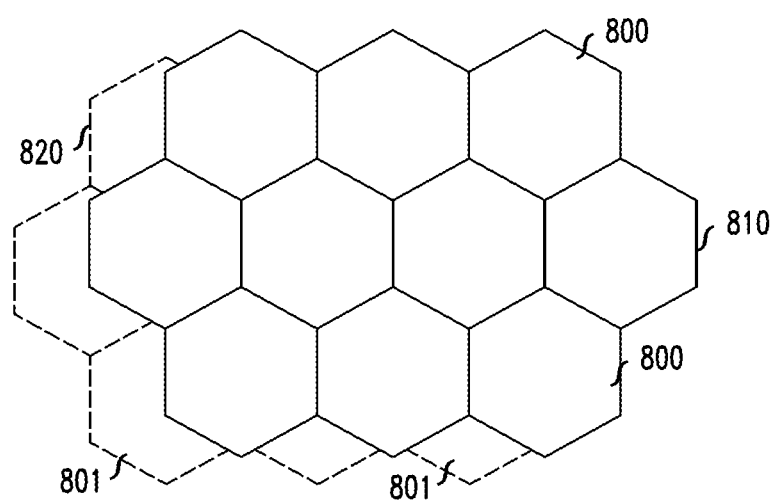
FIG. 8 illustrates a cellular topology in which the sectors of network PLMN-1 are not colocated with the sectors of network PLMN-2, but instead are offset so that a given sector of one network may partially overlap multiple sectors of the other network. Like FIG. 7, FIG. 8 does not distinguish between cells and individual sectors of the networks.

FIG. 8 illustrates a cellular topology in which the sectors 800 of network PLMN-1 (reference numeral 810) are not colocated with the sectors 801 of network PLMN-2 (reference numeral 820), but instead are offset so that a given sector of one network may partially overlap multiple sectors of the other network. Like FIG. 7, FIG. 8 does not distinguish between cells and individual sectors of the networks.

In the non-colocated topology of FIG. 8, the typical choice of supply sectors is not limited to a single, colocated supply sector. Instead, the SE may designate multiple prospective supply sectors, and it will typically designate those, and only those, supply sectors that overlap the borrowing sector. In that case, co-channel interference is mitigated by requiring all of the supply sectors to release the same carriers or sets of carriers to the demand sector, so that no retained spectrum will suffer interference from (otherwise overlapping) borrowed spectrum.

Unless preventive measures are taken, it is possible for a spectrum supplying sector to sublease an excessive amount of spectrum, and as a consequence to become overloaded. One preventive measure is to limit the maximum permissible bandwidth for subleasing to a demand sector.

For example, suppose that a supply sector ss of PLMN-1 owns a carrier C1 of bandwidth 5 MHz, which is equivalent to 25 PRBs. Sector ss is lightly loaded and willing to supply a portion of C1 to a heavily loaded demand sector ds of PLMN-2. A maximum permissible bandwidth $C_{12,ss}^{max}$ for subleasing is computed from the current average PRB utilization level $\overline{M}_{ss}^{C1}$ of supply sector ss. One possible set of rules for computing $C_{12,ss}^{max}$ is:

$$C_{12,ss}^{max} = \begin{cases} 3 \text{ MHz (15 } PRBs\text{), if } M_{ss}^{C1} \le 4.8 \text{ } PRBs \\ 1.4 \text{ MHz (6 } PRBs\text{), if } M_{ss}^{C1} \le 12.0 \text{ } PRBs \\ 0 \text{ MHz (No Sharing), otherwise} \end{cases}.$$

Figure 9:
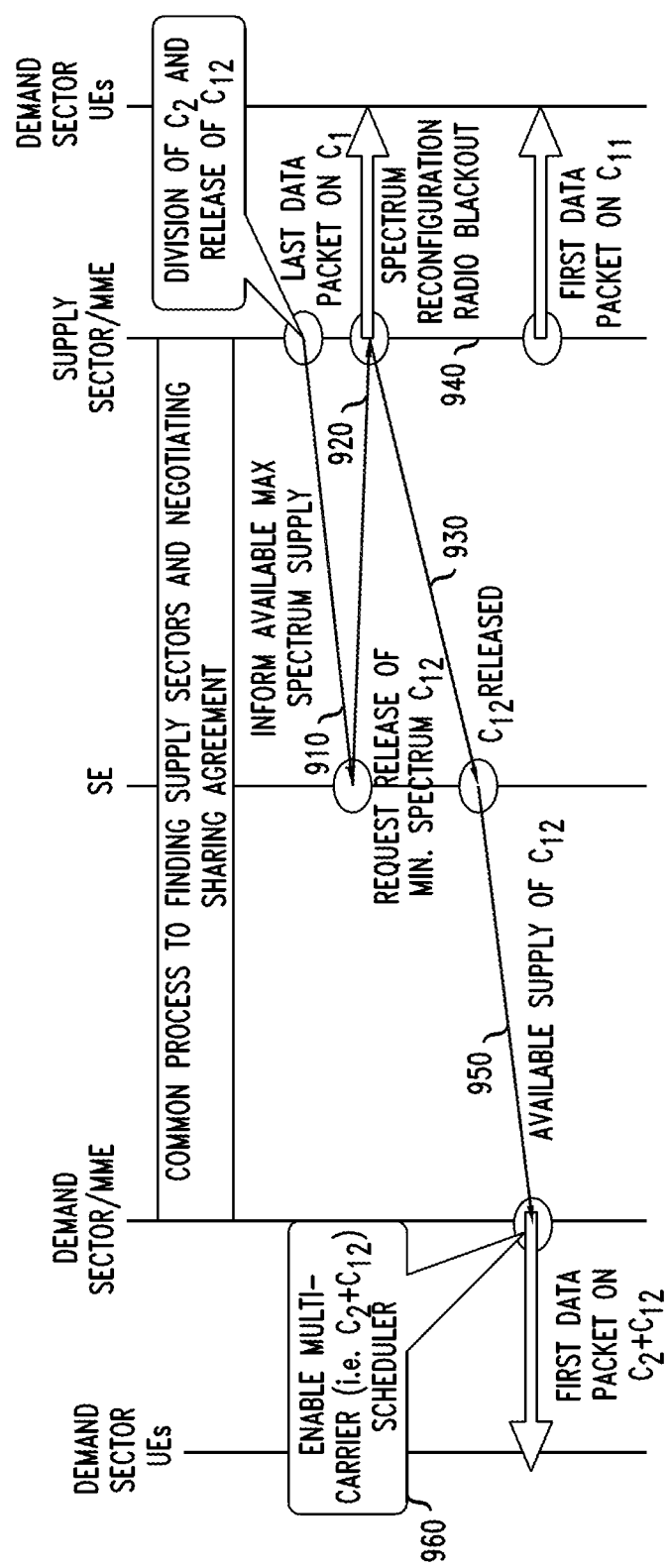
FIG. 9 is a timing diagram that illustrates a method of reconfiguring a network for spectrum sharing according to an embodiment of the invention.

Accordingly, with reference to FIG. 9, the supply sector ss in cooperation with the supply MME notifies 910 the SE of the current computed value of $C_{12,ss}^{max}$. The SE responds 920 with a subleased spectrum release request. In the event that there are multiple supply sectors, the smallest value of $C_{12,ss}^{max}$ over the set of supply sectors is selected, notified to the SE, and notified to the supply sectors in a subleased spectrum release request.

Upon receiving the release request, each supply sector, in cooperation with the supply MME, initiates the spectrum division and reconfiguration process. According to that process, the supply sector notifies 930 the SE of the release, and the spectrum is reconfigured 940. That is, the sector UEs are placed into the SUSPEND state, the spectrum C1 is partitioned into portions C11 and C12, portion C11 is retained, and portion C12 is released. Illustratively, in an LTE network in which C1=5 MHz (equivalent to 25 PRBs), C12 can be 3 MHz (15 PRBs) or 1.4 MHz (6 PRBs), and the corresponding retained bandwidth C11 respectively 1.4 MHz (6 PRBs) or 3 MHz (15 PRBs). For a given size of supply bandwidth, i.e. 3 MHz or 1.4 MHz, the spectral position of C12 is desirably fixed, to limit interference that could otherwise arise.

Upon receiving C12 release messages from all supply sectors (in cooperation with the supply MME), the SE notifies 950 the demand sector ds of the availability of C12 for the demand sector to use. The demand sector now has two (typically non-contiguous) carriers, C2 and C12 which collectively define a combined spectrum C+, and due to the borrowing, it has an additional 6 or 15 PRBs available for it to use.

Even with the added spectrum, it is possible that the demand sector ds may under some circumstances enter an overload condition. An overload condition may be defined in terms of the total number $N_{ds}^{C+}$ of PRBs that correspond to the combined spectrum, and the average PRB utilization level $\overline{M}_{ds}^{C+}$ on the combined spectrum. For example, an overload state may be declared if $\overline{M}_{ds}^{C+} \ge 0.9 N_{ds}^{C+}$.

Likewise, the supply sector, which now has a reduced number $N_{ss}^{C-}$ of available PRBs on the retained spectrum C− may be declared to be in an overload state if its current average PRB utilization level $\overline{M}_{ss}^{C-}$ satisfies $\overline{M}_{ss}^{C-} \ge 0.9 N_{ss}^{C-}$. The overload determination will typically be made by the scheduler functionality, which typically runs on a processor in the eNodeB.

With further reference to FIG. 9, the demand sector activates 960 a scheduler, which runs on a processor in the baseband processing portion of the eNode B, when the demand sector is notified by its MME that it has received the grant of borrowed spectrum C12 from the SE. The demand sector prepares to operate on the borrowed spectrum by appropriately configuring its RF front end.

Now at the borrowing sector, the demand network can begin to use the newly acquired spectrum without performing the Spectrum Division and Sharing process described above with reference to the supply network. Instead, the demand network can simply begin radiating on the new spectrum. The UEs will automatically detect the new spectrum and will attempt to access it or to handover to it. Moreover, if the network uses a multicarrier scheduler, the scheduler can redirect selected UEs to the new spectrum.

The multicarrier scheduler creates two identical instances of a scheduler, one for carrier C2 and the other for carrier C12. With multicarrier scheduling, it is possible in particular to selectively redirect UEs served by the demand sector from C2 to the newly borrowed spectrum C12. One benefit of such redirection is that it can relieve overload conditions on C2.

In addition, a carrier aggregation (CA) feature may be available in some networks, such as LTE networks that conform to the LTE-Advanced standard in Release 10 or beyond. The CA feature is described, e.g., in M. Iwamura et al., "Carrier Aggregation Framework in 3GPP LTE-Advanced," *IEEE Comm Mag.* (August 2010) 60-67. Briefly, the CA feature provides a flexible way to aggregate carriers for expanded downlink and uplink bandwidths. In particular, this feature makes it possible for a single scheduler to use carrier C2 and carrier C12 concurrently. In these implementations, UEs served by the demand sector that are capable of carrier aggregation are reconfigured to support the carrier-aggregated scheduler.

The CA feature provides for CA-capable UEs to be concurrently served by a primary cell (Pcell) at which the UE is anchored and a secondary cell (Scell) co-located with the Pcell at the same eNodeB and operating on different spectrum from the Pcell.

After the borrowing spectrum has been released to the demand network and acquired by it, an E-UTRAN of the demand network in an exemplary scenario reconfigures its CA-capable UEs to add the Scell as a newly activated cell on the borrowed spectrum. The CA-capable UEs are identified from capability information available to the E-UTRAN during the UE attachment (i.e., network access) process. The UEs are reconfigured while in the RRC_CONNECTED state via RRCConnectionReconfigure messages.

The CA-capable UEs can now be served by one or both of the cells and in particular, they can be scheduled on spectrum allocated to both the Pcell and the Scell. Subsequently, the Pcell and Scell can be interchanged, based on one or more policies including, i.e., a policy that the cell offering the best channel quality should be the Pcell.

According to one useful scheduling policy for the demand sector, all UEs currently served (prior to the borrowing) by the demand sector ds are admissible for scheduling on C2 (i.e, on the native carrier of the demand sector), but only a selected group of UEs is admissible for scheduling on the borrowed spectrum C12. Thus, for example, a UE may be selected as a candidate for scheduling on the borrowed spectrum if the following two conditions are met:

(1) The UE is not meeting its required quality of service (QoS) because the current channel quality from sector ds to the UE on carrier C2 is poor, and there is an expectation that the channel quality will improve on migration to the borrowed spectrum; and (2) The reference signal received power (RSRP) of the current serving sector (i.e., of the demand sector) on the borrowed spectrum C12 is better than the RSRP of neighboring sectors on the same spectrum, and it is also better than the RSRP of the current serving sector on its own native spectrum C2. An example of this condition in mathematical notation, wherein the RSRP of the demand sector on the borrowed and native spectrum is respectively denoted $RSRP_{ds}^{C12}$ and $RSRP_{ds}^{C2}$, and the RSRP of a neighboring sector on the borrowed spectrum is denoted $RSRP_n^{C12}$, is provided by:

$$RSRP_{ds}^{C12} > RSRP_n^{C12} + hys; \text{ and}$$
$$RSRP_{ds}^{C12} > RSRP_{ds}^{C2} + hys,$$

where hys represents a hysteresis margin.

After the sharing agreement is dissolved, the CA feature at the supply sector can facilitate the Spectrum Resolution and Integration process.

We claim:

1. A method performed by a processor connected to a node of a wireless core network that controls at least one radio access network (RAN) and is operated by at least a first operator, comprising:
    obtaining key performance indicators (KPIs) from one or more cells served by the core network;
    deciding to make a sharing attempt based on the KPIs, wherein the sharing attempt is an attempt to supply spectrum;
    announcing the sharing attempt to a sharing entity (SE) embodied in a processor connected to the wireless core network;
    obtaining from the SE the identity of at least one further operator and the terms of a sharing agreement with the further operator; and
    configuring the RAN to support the supplying of spectrum to the further operator according to the terms of the sharing agreement, the configuring including,
        sending, to at least one base station, information that identifies one or more carriers to be released by at least one sector for sharing;
        causing said base station, without service disruption, to migrate mobile terminals in the one or more sharing sectors off of the carriers that are to be released; and
        notifying the SE of the released carriers.

2. The method of claim 1, wherein the node of the wireless core network is an MME.

3. The method of claim 1, wherein the step of causing said base station to migrate mobile stations comprises, with respect to each sharing sector:
    identifying a partition of the total spectrum allocated to the sharing sector between shared spectrum and unshared spectrum; and
    causing the base station to migrate mobile terminals onto one or more carriers belonging to the unshared spectrum.

4. The method of claim 3, further comprising, if an insufficient number of mobile terminals can be migrated onto the unshared spectrum:
    partitioning the shared spectrum between released spectrum and retained spectrum; and
    causing the base station to migrate mobile terminals off of the released spectrum and onto one or more carriers belonging to the retained spectrum.

5. The method of claim 4, further comprising, before configuring the RAN:
    causing the base station to place the mobile terminals of the sharing sector or sectors into a temporary Suspend state in which no user-plane or control-plane communication takes place between the mobile terminal and the RAN.

6. The method of claim 1, wherein the step of configuring the RAN comprises configuring at least one software-defined programmable radiofrequency front end of a base station.

7. Apparatus comprising:
    a module configured for obtaining key performance indicators (KPIs) from one or more cells served by a wireless core network that controls at least one radio access network (RAN) and is operated by at least a first operator;
    a module configured for formulating attempts to share spectrum based on the KPIs;
    a module configured for announcing sharing attempts to a sharing entity (SE) embodied in a processor connected to the wireless core network and for obtaining from the SE the identities of further operators and the terms of sharing agreements with the further operators; and
    a RAN-configuring module configured for configuring the RAN to support borrowing of spectrum from further operators and/or to support supplying of spectrum to further operators according to the terms of sharing agreements, the RAN-configuring module configured to,
        identify a partition of the total spectrum allocated to at least one sector between shared spectrum and unshared spectrum;
        select one or more carriers belonging to the shared spectrum as released carriers;
        configure at least one software-defined programmable radiofrequency front end of a base station for operation on spectrum that is reconfigured due to the release of shared spectrum carriers;
        cause the base station to migrate mobile terminals from released carriers onto one or more carriers that are unreleased from the shared spectrum or that belong to the unshared spectrum without service disruption; and
        notify the SE of the released carriers.

8. The apparatus of claim 7, further comprising: a module configured for causing the base station, before the RAN is configured, to place the mobile terminals of the carrier-releasing sector or sectors into a temporary Suspend state in which no user-plane or control-plane communication takes place between the mobile terminal and the RAN.

* * * * *